United States Patent
Xu et al.

(10) Patent No.: US 10,390,340 B2
(45) Date of Patent: Aug. 20, 2019

(54) METHOD AND APPARATUS FOR PERFORMING OFFLOADING PROCEDURES FOR WLAN-LTE INTEGRATION AND INTERWORKING IN WIRELESS COMMUNICATION SYSTEM

(71) Applicant: LG ELECTRONICS INC., Seoul (KR)

(72) Inventors: Jian Xu, Seoul (KR); Jaewook Lee, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/556,159

(22) PCT Filed: Mar. 25, 2016

(86) PCT No.: PCT/KR2016/003024
§ 371 (c)(1),
(2) Date: Sep. 6, 2017

(87) PCT Pub. No.: WO2016/153306
PCT Pub. Date: Sep. 29, 2016

(65) Prior Publication Data
US 2018/0049063 A1    Feb. 15, 2018

Related U.S. Application Data

(60) Provisional application No. 62/138,369, filed on Mar. 25, 2015, provisional application No. 62/233,304, (Continued)

(51) Int. Cl.
*H04W 72/04* (2009.01)
*H04W 76/12* (2018.01)
(Continued)

(52) U.S. Cl.
CPC ....... *H04W 72/0433* (2013.01); *H04W 28/08* (2013.01); *H04W 28/085* (2013.01);
(Continued)

(58) Field of Classification Search
CPC ... H04W 28/08; H04W 28/085; H04W 92/20; H04W 76/025
See application file for complete search history.

(56) References Cited

U.S. PATENT DOCUMENTS

2010/0182910 A1* 7/2010 Norefors ............. H04W 4/02
370/241
2011/0075675 A1 3/2011 Koodli et al.
(Continued)

FOREIGN PATENT DOCUMENTS

WO        13045537 A1   4/2013
WO     2015008989 A1   1/2015
(Continued)

OTHER PUBLICATIONS

"3rd Generation Partnership Project;Technical Specification Group Radio Access Network;Evolved UniversalTerrestrial Radio Access Network"; Release 12; 3GPP TS 36.423 V12.5.0 (Mar. 2015); pp. 1-208.
(Continued)

*Primary Examiner* — Asad M Nawaz
*Assistant Examiner* — Berhanu D Belete
(74) *Attorney, Agent, or Firm* — Dentons US LLP

(57) ABSTRACT

A method and apparatus for performing a wireless local area network (WLAN) termination (WT) addition/modification procedure in a wireless communication system is provided. For the WT addition procedure, an eNodeB (eNB) transmits a WT Addition Request message to a WT via a Xw interface, and receives a WT Addition Request Acknowledge message from the WT via the Xw interface. For eNB initiated WT
(Continued)

modification procedure, the eNB transmits a WT Modification Request message to a WT via a Xw interface, and receives a WT Modification Request Acknowledge message from the WT via the Xw interface. For the WT initiated WT modification procedure, the eNB receives a WT Modification Required message from a WT via a Xw interface, and transmits a WT Modification Confirm message to the WT via the Xw interface. The WT is a logical node that terminates the Xw interface.

6 Claims, 22 Drawing Sheets

Related U.S. Application Data filed on Sep. 26, 2015, provisional application No. 62/252,421, filed on Nov. 7, 2015.

(51) Int. Cl.
| | |
|---|---|
| *H04W 28/08* | (2009.01) |
| *H04W 76/15* | (2018.01) |
| *H04W 76/18* | (2018.01) |
| *H04W 76/22* | (2018.01) |
| *H04W 76/27* | (2018.01) |
| *H04W 76/32* | (2018.01) |
| *H04W 84/12* | (2009.01) |
| *H04W 92/20* | (2009.01) |
| *H04W 84/04* | (2009.01) |

(52) U.S. Cl.
CPC ........... *H04W 76/12* (2018.02); *H04W 76/15* (2018.02); *H04W 76/18* (2018.02); *H04W 76/22* (2018.02); *H04W 76/27* (2018.02); *H04W 76/32* (2018.02); *H04W 72/042* (2013.01); *H04W 72/0413* (2013.01); *H04W 84/042* (2013.01); *H04W 84/12* (2013.01); *H04W 92/20* (2013.01)

(56) References Cited

U.S. PATENT DOCUMENTS

| | | |
|---|---|---|
| 2014/0079022 A1 | 3/2014 | Wang et al. |
| 2014/0211759 A1 | 7/2014 | Guo et al. |
| 2015/0124748 A1* | 5/2015 | Park ............... H04L 5/0032 370/329 |
| 2015/0350954 A1* | 12/2015 | Faccin ............ H04W 76/16 370/254 |
| 2016/0128110 A1* | 5/2016 | Sirotkin ........... H04W 76/12 370/329 |
| 2016/0373964 A1 | 12/2016 | Nagasaka et al. |
| 2017/0048913 A1* | 2/2017 | Teyeb ............. H04W 48/18 |
| 2017/0135151 A1 | 5/2017 | Fujishiro et al. |
| 2017/0265241 A1 | 9/2017 | Fujishiro et al. |
| 2017/0367007 A1* | 12/2017 | Sirotkin ......... H04L 63/0428 |
| 2018/0199394 A1* | 7/2018 | Teyeb ............. H04W 76/16 |
| 2018/0242209 A1* | 8/2018 | Xu ................. H04W 36/00 |

FOREIGN PATENT DOCUMENTS

| | | |
|---|---|---|
| WO | 2015012631 A1 | 1/2015 |
| WO | 2015016654 A1 | 2/2015 |
| WO | 2015037926 A1 | 3/2015 |
| WO | 2016073113 A1 | 5/2016 |

OTHER PUBLICATIONS

Ericsson; R3-150325; "RAN-WLAN Architecture Model and Information Exchange"; 3GPP TSG-RAN WG3 #87; Athens, Greece, Feb. 9-13, 2015; pp. 1-5.
Intel Corporation, China Telecom, InterDigital Communications, "Remaining control plane aspects of LWA", 3GPP TSG-RAN WG3 Meeting #90, Nov. 16-20, 2015, R3-152446.
Huawei, "Details of operations for LTE-WLAN aggregation", 3GPP TSG-RAN WG3 Meeting #89, Aug. 24-28, 2015, R3-151375.
Intel Corporation, China Telecom, Qualcomm Incorporated, "New WI Proposal: LTE-WLAN Radio Level Integration and Interworking Enhancement", 3GPP TSG RAN Meeting #67, Mar. 9-12, 2015, RP-150510.
R3-140117: 3GPP TSG-RAN WG3 Meeting #83, Prague, Czech Republic, Feb. 10-14, 2014, Huawei, "MeNB Mobility Procedure", pp. 1-5.
R3-150185: 3GPP TSG-RAN WG3 #87, Athens, Greece, Feb. 9-13, 2015, Nokia Networks, Huawei, "3GPP-WLAN direct interface protocol stack and architecture," pp. 1-4.
R3-142917: 3GPP TSG-RAN WG3 #86, San Francisco, USA, Nov. 17-21, 2014, Ericsson "RAN-WLAN Information Exchange," pp. 1-3.
3GPP TR 37.870 V1.0.0: (Feb. 2015) 3rd Generation Partnership Project: Technical Specification Group Radio Access Network: Study on Multi-RAT joint coordination pp. 1-22.

\* cited by examiner

METHOD AND APPARATUS FOR PERFORMING OFFLOADING PROCEDURES FOR WLAN-LTE INTEGRATION AND INTERWORKING IN WIRELESS COMMUNICATION SYSTEM

This application is a 35 USC § 371 National Stage entry of International Application No. PCT/KR2016/003024, filed on Mar. 25, 2016, and claims priority to U.S. Provisional Application No. 62/138,369, filed on Mar. 25, 2015, U.S. Provisional Application No. 62/233,304, filed on Sep. 26, 2015, and U.S. Provisional Application No. 62/252,421, filed on Nov. 7, 2015 all of which are incorporated by reference in their entirety herein.

BACKGROUND OF THE INVENTION

Field of the Invention

The present invention relates to wireless communications, and more particularly, to a method and apparatus for performing offloading procedures for wireless local area network (WLAN)-long term evolution (LTE) integration and interworking in a wireless communication system.

Related Art

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Since Rel-8, 3GPP has standardized access network discovery and selection functions (ANDSF), which is for interworking between 3GPP access network and non-3GPP access network (e.g. wireless local area network (WLAN)). The ANDSF may carry detection information of access networks accessible in location of a user equipment (UE) (e.g., WLAN, WiMAX location information, etc.), inter-system mobility policies (ISMP) which is able to reflect operator's policies, and inter-system routing policy (ISRP). Based on the information described above, the UE may determine which Internet protocol (IP) traffic is transmitted through which access network. The ISMP may include network selection rules for the UE to select one active access network connection (e.g., WLAN or 3GPP). The ISRP may include network selection rules for the UE to select one or more potential active access network connection (e.g., both WLAN and 3GPP). The ISRP may include multiple access connectivity (MAPCON), IP flow mobility (IFOM) and non-seamless WLAN offloading. Open mobile alliance (OMA) device management (DM) may be used for dynamic provision between the ANDSF and the UE.

In addition to ANDSF, policy, i.e. radio access network (RAN) rule, has been specified in Rel-12 for interworking between 3GPP access network and non-3GPP access network (e.g. WLAN). By this policy, access network selection and traffic steering between LTE and WLAN can be supported. That is, interworking between LTE and WLAN is moving in the direction of increasingly integrating LTE and WLAN. Accordingly, LTE-WLAN aggregation as well as LTE-WLAN interworking enhancements has been studied recently. But, there has been no agreement how to implement LTE-WLAN aggregation.

SUMMARY OF THE INVENTION

The present invention provides a method and apparatus for performing offloading procedures for wireless local area network (WLAN)-long term evolution (LTE) integration and interworking in a wireless communication system. The present invention provides procedures and parameters for WLAN-LTE interworking and aggregation.

In an aspect, a method for performing, by an eNodeB (eNB), a wireless local area network (WLAN) termination (WT) addition procedure in a wireless communication system is provided. The method includes transmitting a WT Addition Request message to a WT via a Xw interface, and receiving a WT Addition Request Acknowledge message from the WT via the Xw interface, as a response to the WT Addition Request message. The WT is a logical node that terminates the Xw interface.

The WT Addition Request message may request the WT to allocate WLAN resources for specific E-UTRAN radio access bearers (E-RABs). The WT Addition Request message may include at least one of an eNB Xw application protocol (AP) identifier (ID), an E-RAB ID, an E-RAB quality of service (QoS) and a GPRS tunneling protocol (GTP) tunnel endpoint for E-RABs to be added, a security key or a selected WLAN identifier. The selected WLAN identifier may include at least one of a service set ID (SSID), a basic service set ID (BSSID) or a homogeneous extended service set ID (HESSID)).

The WT Addition Request Acknowledge message may include at least one of an eNB Xw AP ID, a WT UE Xw AP ID, an E-RAB ID and WT GTP tunnel endpoint for admitted E-RABs or E-RAB IDs for not admitted E-RABs.

The method may further include transmitting a WT Reconfiguration Complete message to the WT.

In another aspect, a method for performing, by an eNodeB (eNB), an eNB initiated wireless local area network (WLAN) termination (WT) modification procedure in a wireless communication system is provided. The method includes transmitting a WT Modification Request message to a WT via a Xw interface, and receiving a WT Modification Request Acknowledge message from the WT via the Xw interface, as a response to the WT Modification Request message. The WT is a logical node that terminates the Xw interface.

The WT Modification Request message may request the WT to modify WLAN resources for specific E-UTRAN radio access bearers (E-RABs). The WT Modification Request message may include at least one of an eNB Xw application protocol (AP) identifier (ID), a WT UE Xw AP ID, an E-RAB ID, an E-RAB quality of service (QoS) and a GPRS tunneling protocol (GTP) tunnel endpoint for E-RABs to be added/modified/released, a security key, a selected WLAN identifier, a cause to modify or a WLAN/WT change indication. The selected WLAN identifier may include at least one of a service set ID (SSID), a basic service set ID (BSSID) or a homogeneous extended service set ID (HESSID)).

The WT Modification Request Acknowledge message may include at least one of an eNB Xw AP ID, a WT UE Xw AP ID, an E-RAB ID and WT GTP tunnel endpoint for admitted E-RABs or E-RAB IDs for not admitted E-RABs.

The method may further include transmitting a WT Reconfiguration Complete message to the WT.

In another aspect, a method for performing, by an eNodeB (eNB), a wireless local area network (WLAN) termination (WT) initiated WT modification procedure in a wireless communication system is provided. The method includes receiving a WT Modification Required message from a WT via a Xw interface, and transmitting a WT Modification Confirm message to the WT via the Xw interface, as a response to the WT Modification Required message. The WT is a logical node that terminates the Xw interface.

The WT Modification Required message may request release of allocated WLAN resources for specific E-UTRAN radio access bearers (E-RABs). The WT Modification Required message may include at least one of an eNB Xw application protocol (AP) identifier (ID), a WT UE Xw AP ID, an E-RAB ID and a cause for E-RABs to be released, a cause to modify or a WLAN/WT change indication.

The WT Modification Confirm message may include at least one of an eNB AP ID or a WT UE Xw AP ID.

Wireless local area network (WLAN) termination (WT) addition/modification/release procedure can be defined.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
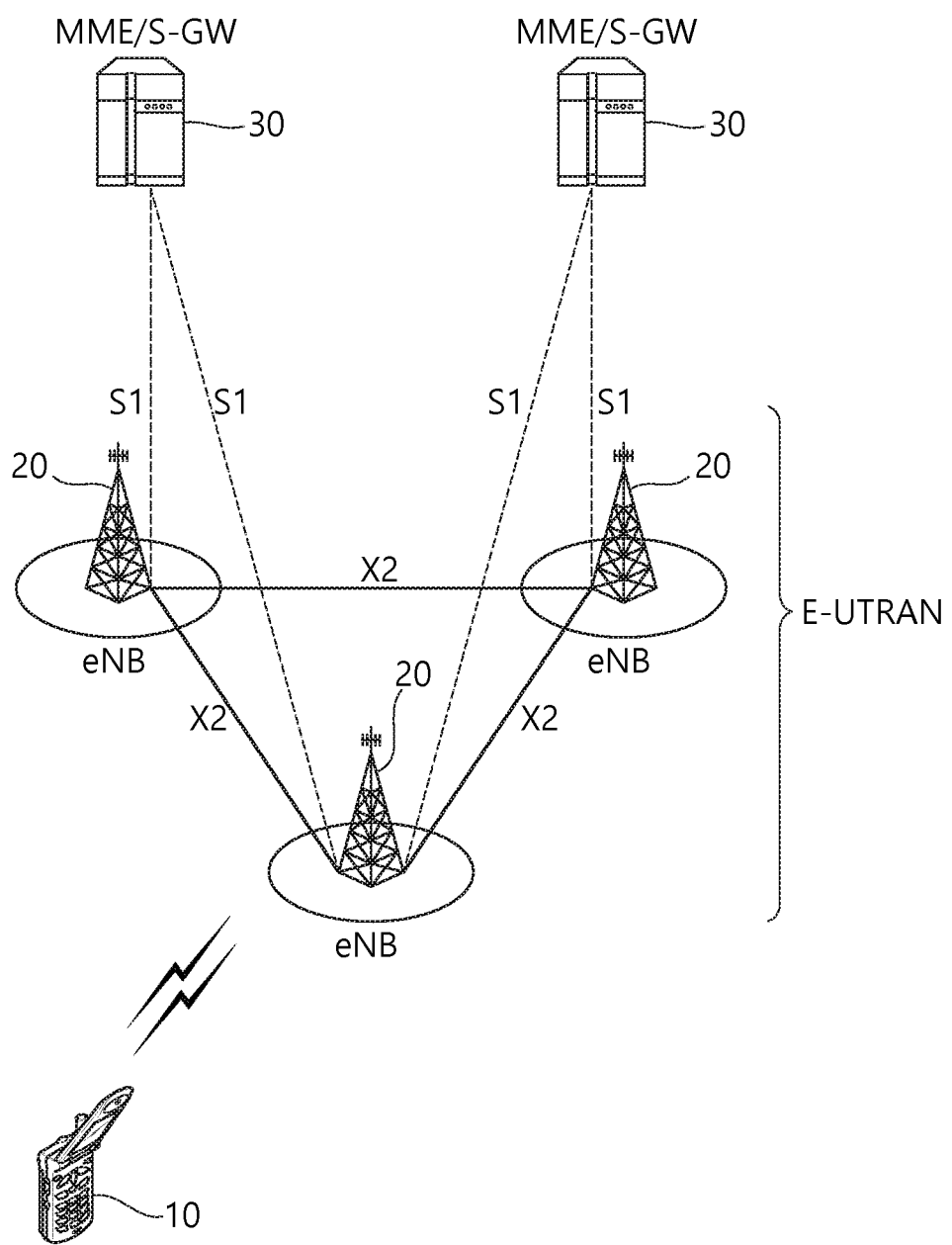
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a serving gateway (S-GW). The MME/S-GW 30 may be positioned at the end of the network. For clarity, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
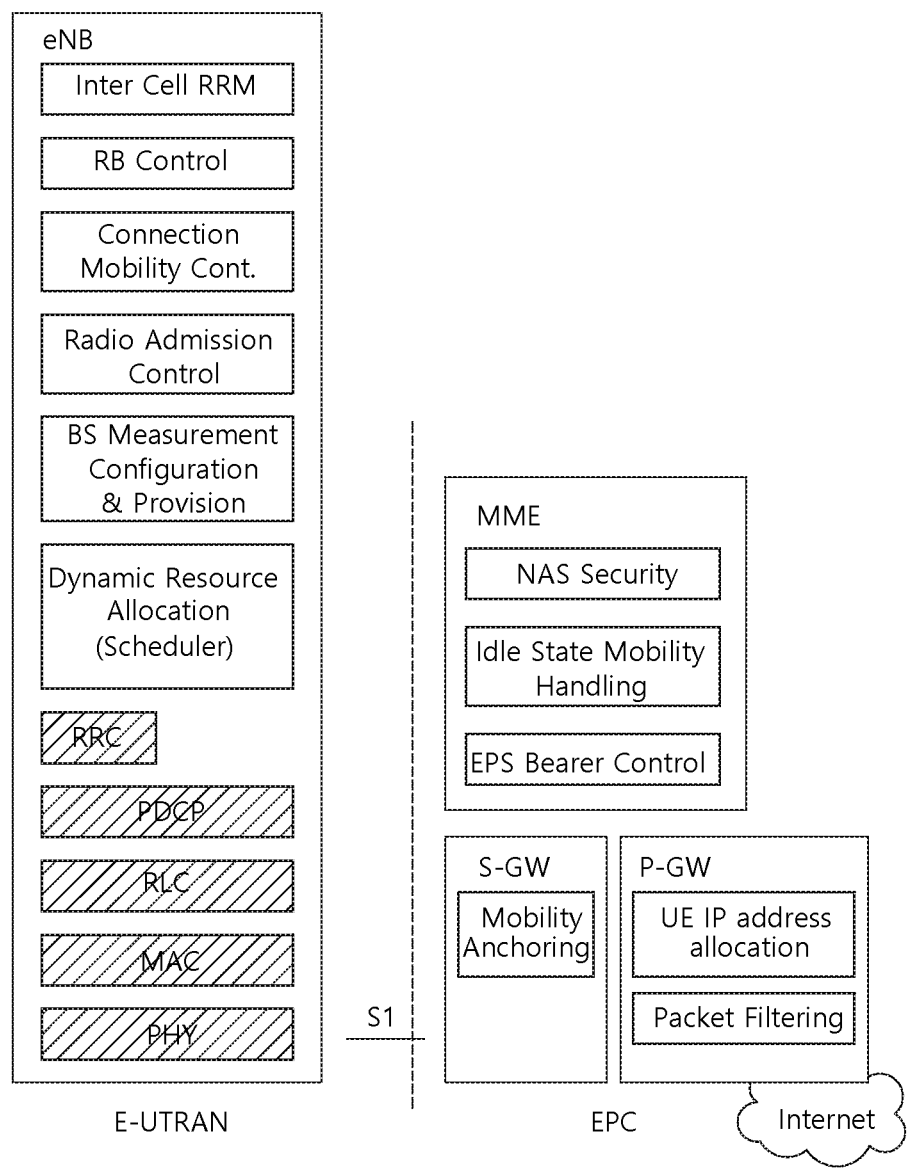
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
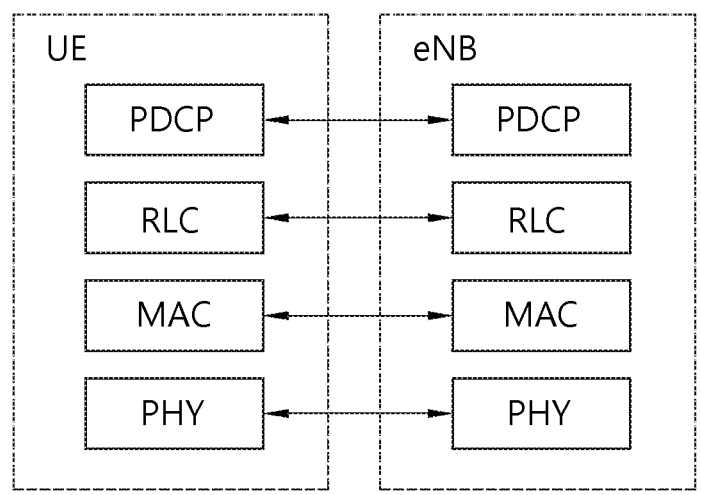
FIG. 3 shows a block diagram of a user plane protocol stack of an LTE system.
Figure 4:
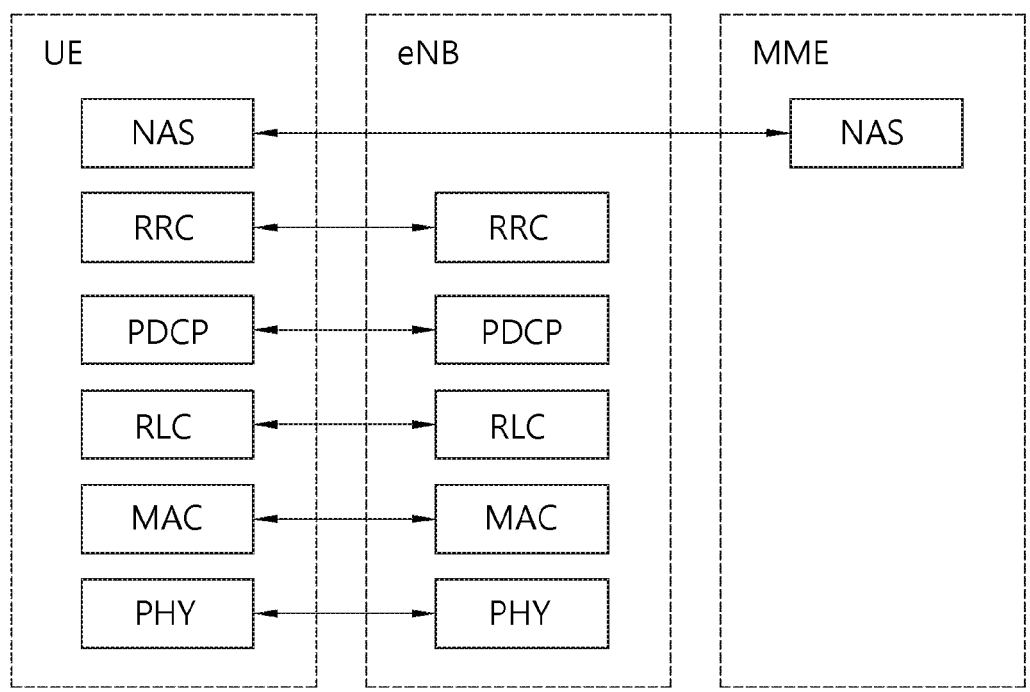
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
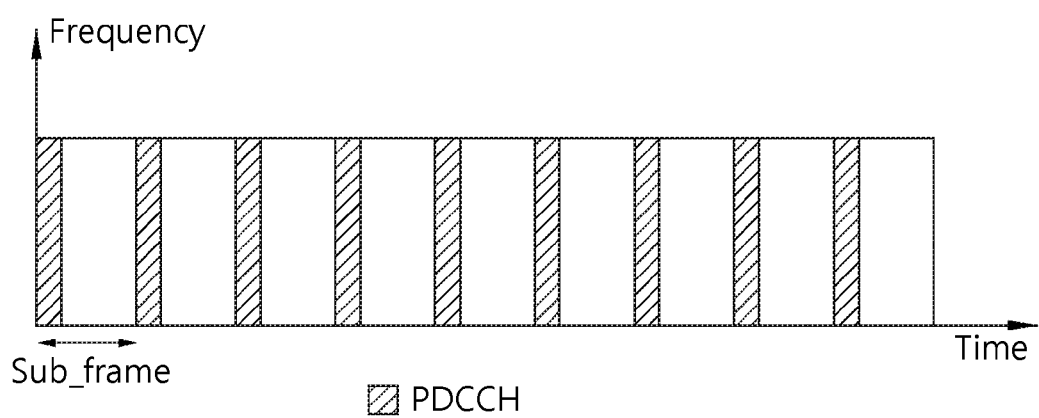
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

In Rel-12, 3GPP/WLAN interworking for access network selection and traffic steering was introduced. In order to performing traffic steering from LTE to WLAN or vice versa, UE decision based solution was defined in Rel-12. That is, the eNB may just provide radio access network (RAN) rule to the UE, and the UE may decide which access network to select or to which access network traffic is to be steered, based on the received RAN Rule and its information.

Figure 6:
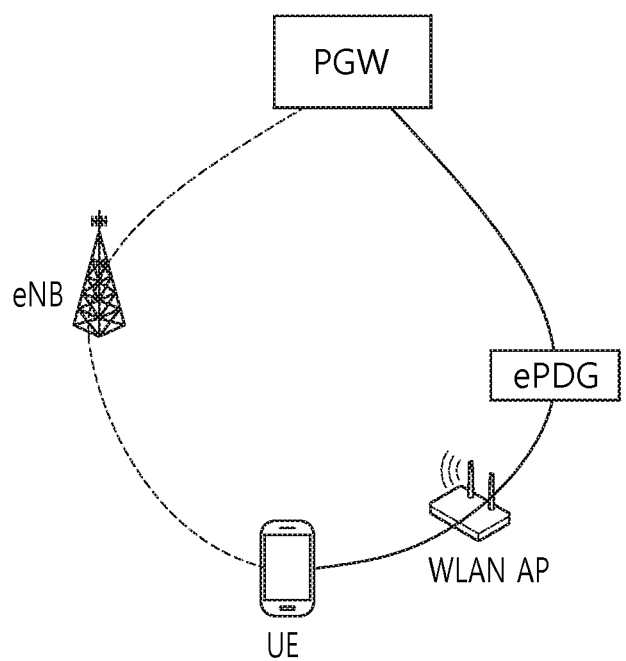
FIG. 6 shows an example of 3GPP/WLAN interworking architecture.

FIG. 6 shows an example of 3GPP/WLAN interworking architecture. Referring to FIG. 6, the UE is connected to the P-GW via the eNB in 3GPP access network, via enhanced packet data gateway (ePDG) in non-3GPP access network, i.e. WLAN. The eNB may provide RAN rule to the UE. The UE may determine access network to which traffic is to be steered between 3GPP and WLAN, based on the RAN rule and information that the UE has.

3GPP/WLAN interworking for access network selection and traffic steering introduced in Rel-12 is different from legacy mobility procedure (e.g. S1/X2 handover procedure), in which the eNB always makes the decision. Accordingly, 3GPP/WLAN interworking controlled by the eNB has been discussed from Rel-13. Currently, there is no procedure for 3GPP/WLAN interworking controlled by the eNB.

3GPP/WLAN radio interworking Rel-12 solution may enhance core network (CN)-based WLAN offload by improving user quality of experience (QoE) and network utilization and providing more control to operators. These improvements can be further enhanced by LTE-WLAN aggregation and further LTE-WLAN interworking enhancement relevant to both co-located and non-co-located deployment scenarios. The benefits of the LTE-WLAN aggregation are:

(1) WLAN access network becomes transparent to CN in the sense that it should not require WLAN-specific CN nodes and CN interfaces. This provides the operator unified control and management of both 3GPP and WLAN networks as opposed to separately managing them.

(2) Aggregation and tight integration at radio level allows for real-time channel and load aware radio resource management across WLAN and LTE to provide significant capacity and QoE improvements.

(3) The reliable LTE network can be used as a control and mobility anchor to provide QoE improvements, minimize service interruption, and increase operator control.

(4) No new WLAN-related CN signaling is needed, thus reducing CN load.

Accordingly, E-UTRAN may support LTE-WLAN aggregation (LWA) operation whereby a UE in RRC_CONNECTED is configured by the eNB to utilize radio resources of LTE and WLAN. Two scenarios may be supported depending on the backhaul connection between LTE and WLAN, one of which is non-collocated LWA scenario for a non-ideal backhaul, and the other is collocated LWA scenario for an ideal/internal backhaul.

Figure 7:
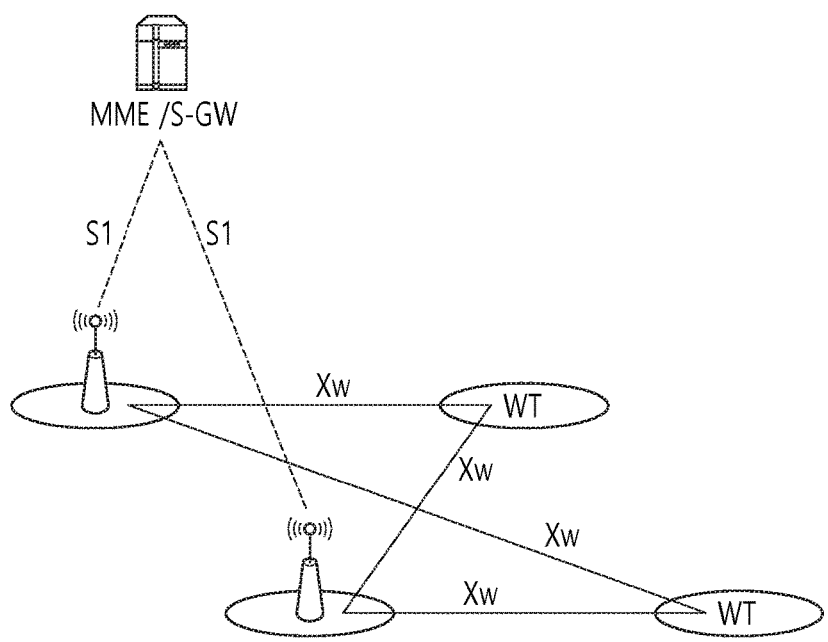
FIG. 7 shows an example of an overall architecture for non-collocated LWA scenario according to an embodiment of the present invention.

FIG. 7 shows an example of an overall architecture for non-collocated LWA scenario according to an embodiment of the present invention. Referring to FIG. 7, WLAN termination (WT) terminates the Xw interface for WLAN. The WT may be a logical node that terminates the Xw interface on the WLAN side, and 3GPP may not specify where it is implemented.

In LWA, the radio protocol architecture that a particular bearer uses may depend on the LWA backhaul scenario and how the bearer is set up. Two bearer types may exist for LWA, one of which is split LWA bearer and the other is switched LWA bearer. The split LWA bearer is a bearer whose radio protocols are located in both the eNB and the WLAN to use both eNB and WLAN radio resources in LWA. The switched LWA bearer is a bearer whose radio protocols are located in both the eNB and the WLAN but uses WLAN radio resources only in LWA.

In the non-collocated LWA scenario, the eNB may be connected to one or more WTs via an Xw interface. In the collocated LWA scenario, the interface between LTE and WLAN may be up to implementation. For LWA, the only required interfaces to the core network are S1-U and S1-MME which are terminated at the eNB. No core network interface may be required for the WLAN.

Figure 8:
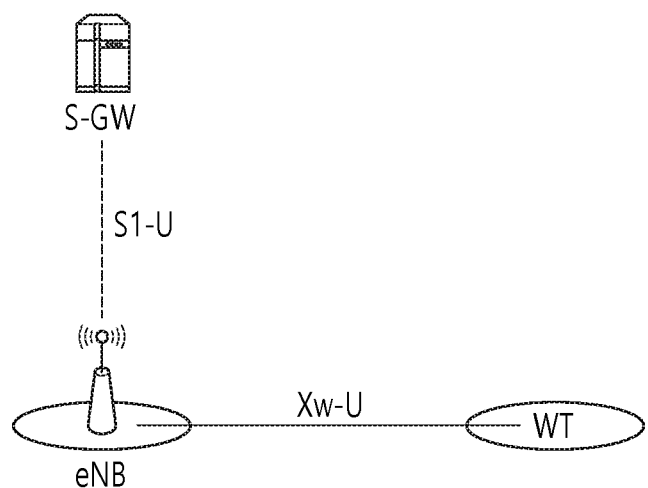
FIG. 8 shows an example of U-plane connectivity of eNB and WT for LWA according to an embodiment of the present invention.

FIG. 8 shows an example of U-plane connectivity of eNB and WT for LWA according to an embodiment of the present invention. Referring to FIG. 8, in the non-collocated LWA scenario, the S1-U is terminated at the eNB, and the eNB and the WT are interconnected via Xw user plane interface (Xw-U). The Xw-U interface may support flow control based on feedback from WT. The flow control function may be applied in the DL when an E-UTRAN radio access bearer (E-RAB) is mapped onto an LWA bearer, i.e. the flow control information may be provided by the WT to the eNB for the eNB to control the DL user data flow to the WT for the LWA bearer. The Xw-U interface may be used to deliver LWA protocol data units (PDUs) between eNB and WT. For LWA, the S1-U may terminate in the eNB and, if Xw-U user data bearers are associated with E-RABs for which the LWA bearer option is configured, the user plane data may be transferred from eNB to WT using the Xw-U interface.

Figure 9:
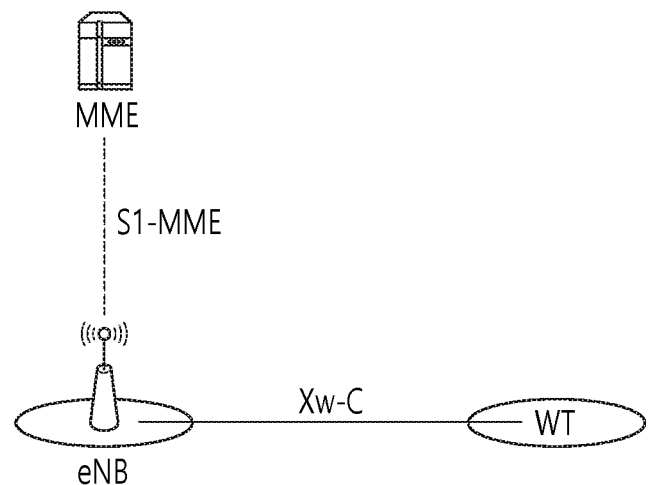
FIG. 9 shows an example of C-plane connectivity of eNB and WT for LWA according to an embodiment of the present invention.

FIG. 9 shows an example of C-plane connectivity of eNB and WT for LWA according to an embodiment of the present invention. Referring to FIG. 9, in the non-collocated LWA scenario, the S1-MME is terminated at the eNB, and the eNB and the WT are interconnected via Xw control plane interface (Xw-C). The application layer signaling protocol may be referred to as Xw-AP (Xw application protocol). The Xw-AP protocol supports the following functions:

Transfer of WLAN metrics (e.g. bss load) from WT to eNB;

Support of LWA for UE in ECM-CONNECTED: Establishment, modification and release of a UE context at the WT, and/or control of user plane tunnels between eNB and WT for a specific UE for LWA bearers;

General Xw management and error handling functions: Error indication; setting up the Xw; resetting the Xw; updating the WT configuration data;

eNB-WT control plane signaling for LWA may be performed by means of Xw-C interface signaling. There may be only one S1-MME connection per LWA UE between the eNB and the MME. Respective coordination between eNB and WT may be performed by means of Xw interface signaling.

Hereinafter, procedures for both 3GPP-WLAN interworking and integration according to embodiments of the present invention are described. The following procedures may include procedures for different situations, e.g. procedures for WT addition, procedures for WT modification, or procedures for WT release. Further, the following procedures may be based on an interface between eNB and WT, e.g. Xw interface described above or another interface. Further, WT and WLAN may denote to the same meaning in the description below, and accordingly, may be replaced with each other in the description below.

(1) WT Addition Procedure

Figure 10:
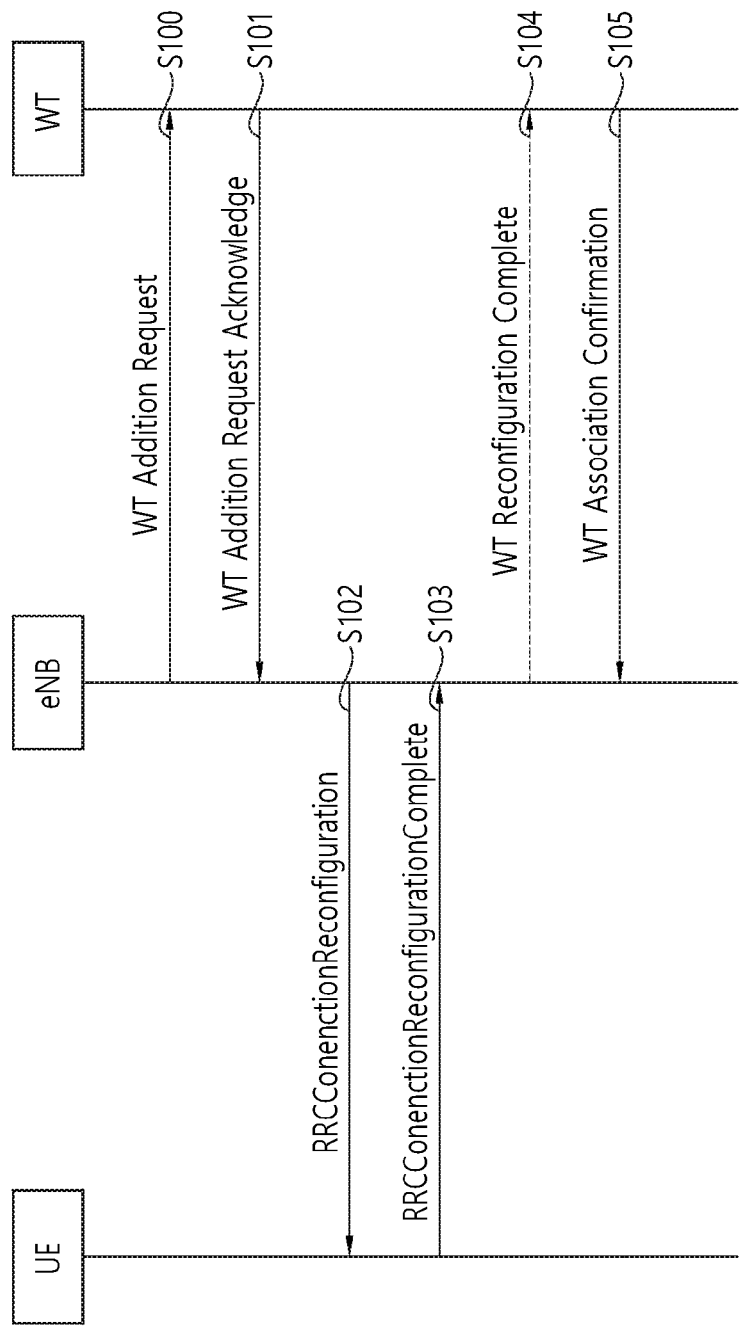
FIG. 10 shows an example of a WT addition procedure according to an embodiment of the present invention.

FIG. 10 shows an example of a WT addition procedure according to an embodiment of the present invention. The WT addition procedure may be initiated by the eNB and may be used to establish a UE context at the WT in order to provide WLAN resources to the UE. That is, the WT addition procedure may be used to request the WT to establish LWA bearer(s) for a specific UE.

In step S100, the eNB transmits a WT Addition Request message to the WT. By this step, the eNB may decide to request the WT to allocate WLAN resources for specific E-RABs, indicating E-RAB characteristics. The WT Addition Request message may include the LWA bearer(s) for the specific UE. More specifically, the WT Addition Request message may include at least one of 1) eNB Xw AP ID to identify the UE, 2) E-RAB ID, E-RAB quality of service (QoS) for E-RABs to be added, 3) eNB GPRS tunneling protocol (GTP) tunnel endpoint (for UL PDU delivery) for E-RABs to be added, 4) data forwarding indication, 5) security key, or 6) selected WLAN identifier (e.g. service set ID (SSID), basic service set ID (BSSID), homogeneous extended service set ID (HESSID)). For LTE-WLAN integration, all pieces of information described above may be included in the WT Addition Request message. For LTE-WLAN interworking, 1), 2) and 6) among pieces of information described above may be included in the WT Addition Request message. The WT may reject the request with a cause value, e.g. no radio resource available.

Table 1 shows an example of the WT Addition Request message. This message is sent by the eNB to the WT to request the preparation of resources for LTE-WLAN aggregation for a specific UE.

TABLE 1

| IE/Group Name | Presence | Range | IE type and reference | Semantics description | Criticality | Assigned Criticality |
|---|---|---|---|---|---|---|
| Message Type | M | | 9.2.1 | | YES | reject |
| eNB UE XwAP ID | M | | UE XwAP ID 9.2.24 | Assigned by the eNB | YES | reject |
| UE Identity | M | | 9.2.16 | | YES | reject |
| WLAN Security Information | O | | 9.2.27 | | YES | reject |
| Serving PLMN | O | | PLMN Identity 9.2.3 | The serving PLMN for the UE. | YES | ignore |
| E-RABs To Be Added List | | 1 | | | YES | reject |

TABLE 1-continued

| IE/Group Name | Presence | Range | IE type and reference | Semantics description | Criticality | Assigned Criticality |
|---|---|---|---|---|---|---|
| >E-RABs To Be Added Item | | 1 ... <maxnoof Bearers> | | | EACH | reject |
| >>E-RAB ID | M | | 9.2.18 | | — | — |
| >>E-RAB Level QoS Parameters | M | | 9.2.19 | Includes necessary QoS parameters | — | — |
| >> eNB GTP Tunnel Endpoint | M | | GTP Tunnel Endpoint 9.2.22 | Endpoint of the Xw transport bearer at the eNB | — | — |
| Mobility Set | M | | 9.2.28 | | YES | reject |

Referring to Table 1, the WT Addition Request message includes eNB Xw AP ID ("eNB UE XwAP ID"), E-RAB ID, E-RAB QoS and eNB GTP tunnel endpoint (in "E-RABs To Be Added Item"), security key ("WLAN Security Information") and selected WLAN identifier ("Mobility Set").

If the WT is able to admit the full or partial WLAN resource request, in step S101, the WT transmits a WT Addition Request Acknowledge message to the eNB. That is, in case one or more GTP tunnel(s) at the WT has been established successfully, the WT may respond with the WT Addition Request Acknowledge message, which includes successfully established and failed to be established bearers for LWA. More specifically, the WT Addition Request Acknowledge message may include at least one of 1) eNB Xw AP ID, WT Xw AP ID to identify the UE, 2) admitted E-RAB IDs, 3) WT GTP tunnel endpoint (for DL PDU delivery) for admitted E-RABs, 4) not admitted E-RAB IDs, 5) data forwarding tunnel IDs (TEIDs), or 6) parameters need to be delivered to UE through eNB (e.g. beacon). For LTE-WLAN integration, all pieces of information described above may be included in the WT Addition Request Acknowledge message. For LTE-WLAN interworking, 1), 2), 4) and 6) among pieces of information described above may be included in the WT Addition Request Acknowledge message.

Table 2 shows an example of the WT Addition Request Acknowledge message. This message is sent by the WT to confirm the eNB about the WT addition preparation.

TABLE 2

| IE/Group Name | Presence | Range | IE type and reference | Semantics description | Criticality | Assigned Criticality |
|---|---|---|---|---|---|---|
| Message Type | M | | 9.2.1 | | YES | reject |
| eNB UE XwAP ID | M | | UE XwAP ID 9.2.24 | Assigned by the eNB | YES | ignore |
| WT UE XwAP ID | M | | UE XwAP ID 9.2.24 | Assigned by the WT | YES | ignore |
| E-RABs Admitted To Be Added List | | 1 | | | YES | ignore |
| >E-RABs Admitted To Be Added Item | | 1 ... <maxnoof Bearers> | | | EACH | ignore |
| >>E-RAB ID | M | | 9.2.18 | | — | — |
| >>WT GTP Tunnel Endpoint | M | | GTP Tunnel Endpoint 9.2.22 | Endpoint of the Xw transport bearer at the WT. | — | — |
| E-RABs Not Admitted List | O | | E-RAB List 9.2.23 | A value for E-RAB ID shall only be present once in E-RABs Admitted List IE and in E-RABs Not Admitted List IE. | YES | ignore |
| Criticality Diagnostics | O | | 9.2.5 | | YES | ignore |

Referring to Table 2, the WT Addition Request Acknowledge message includes eNB Xw AP ID ("eNB UE XwAP ID"), WT Xw AP ID ("WT UE XwAP ID"), admitted E-RAB IDs and WT GTP tunnel endpoint (in "E-RABs Admitted To Be Added Item"), and not admitted E-RAB IDs ("E-RABs Not Admitted List").

In step S102, the eNB transmits the RRCConnectionReconfiguration message to the UE with necessary information from the WT and the information of the eNB. The RRCConnectionReconfiguration message may include the new radio resource configuration. In step S103, the UE applies the new configuration and replies with the RRCConnectionReconfigurationComplete message to the eNB. The UE starts using the new LWA configuration and performs WLAN association.

In step S104, the eNB may transmit a WLAN Reconfiguration Complete message to the WT to indicate the status to the WT. In step S105, the WT transmits a WT Association Confirmation message to the eNB.

Thereafter, for data forwarding or data transmission, the eNB may transmit the SN Status Transfer message to the WT, and data may be forwarded from the S-GW to the WT via the eNB. These steps may be performed for LTE-WLAN integration. Or, to indicate the offloading behavior to the MME, the eNB may perform the path update procedure towards the MME by indicating the E-RABs to be offloaded to the WT. The MME may transmit the Path Update Acknowledge message to the eNB. These steps may be performed for LTE-WLAN interworking. It is described above as if procedures for LTE-WLAN aggregation and procedures for LTE-WLAN interworking are separate from each other. However, it does not have to be separate from each other.

Figure 11:
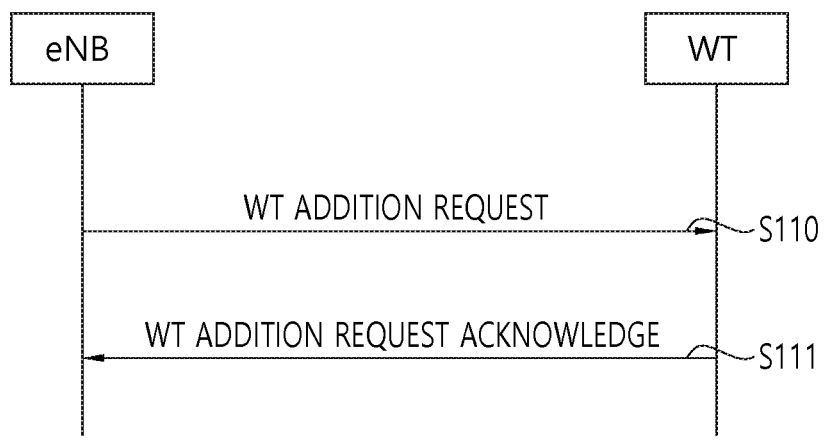
FIG. 11 shows another example of a WT addition procedure according to an embodiment of the present invention.

FIG. 11 shows another example of a WT addition procedure according to an embodiment of the present invention.

In step S110, the eNB transmits the WT Addition Request message to the WT. Step S110 may correspond to step S100 of FIG. 10. The WT Addition Request message may follow Table 1 described above.

In step S111, the WT transmits the WT Addition Request Acknowledge message to the eNB. Step S111 may correspond to step S101 of FIG. 10. The WT Addition Request Acknowledge message may follow Table 2 described above.

(2) eNB Initiated WT Modification Procedure

Figure 12:
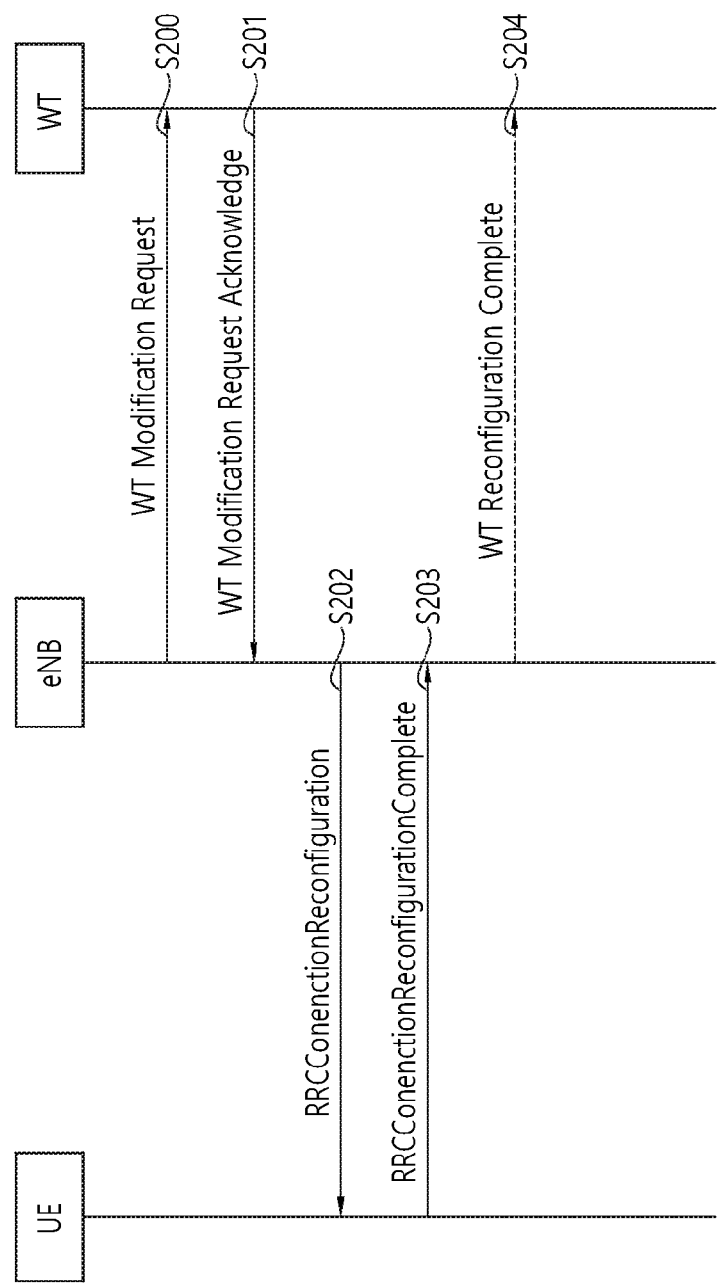
FIG. 12 shows an example of an eNB initiated WT modification procedure according to an embodiment of the present invention.

FIG. 12 shows an example of an eNB initiated WT modification procedure according to an embodiment of the present invention. The eNB initiated WT modification procedure may be used to modify, establish or release bearer contexts or to modify other properties of the UE context within the same WT. That is, the eNB initiated WT modification procedure may be used to request the WT to modify LWA bearer(s) for a specific UE at the WT. The WT modification procedure may not necessarily need to involve signaling towards the UE.

In step S200, the eNB transmits a WT Modification Request message to the WT. By this step, the eNB may request the WT to modify the WLAN resources for specific E-RABs. More specifically, the WT Modification Request message may include at least one of 1) eNB Xw AP ID, WT Xw AP ID to identify the UE, 2) E-RAB ID, E-RAB QoS for E-RABs to be added/modified/released, 3) eNB GTP tunnel endpoint (for UL PDU delivery) for E-RABs to be added/modified/released, 4) data forwarding indication (DL/UL forwarding GTP tunnel endpoint), 5) security key, 6) selected WLAN identifier (e.g. SSID, BSSID, HESSID), 7) cause to modify, or 8) WT change indication. For LTE-WLAN integration, all pieces of information described above may be included in the WT Modification Request message. For LTE-WLAN interworking, 1), 2), 6), 7) and 8) among pieces of information described above may be included in the WT Modification Request message.

Table 3 shows an example of the WT Modification Request message. This message is sent by the eNB to the WT to request the preparation to modify WT resources for a specific UE.

TABLE 3

| IE/Group Name | Presence | Range | IE type and reference | Semantics description | Criticality | Assigned Criticality |
|---|---|---|---|---|---|---|
| Message Type | M | | 9.2.1 | | YES | reject |
| eNB UE XwAP ID | M | | UE XwAP ID 9.2.24 | Assigned by the eNB | YES | reject |
| WT UE XwAP ID | M | | UE XwAP ID 9.2.24 | Assigned by the WT | YES | reject |
| Cause | M | | 9.2.4 | | YES | ignore |
| Serving PLMN | O | | PLMN Identity 9.2.3 | The serving PLMN for the UE. | YES | ignore |
| UE Context Information | | 0 ... 1 | | | YES | reject |
| >WLAN Security Information | O | | 9.2.27 | | | |
| >E-RABs To Be Added List | | 0 ... 1 | | | — | — |
| >>E-RABs To Be Added Item | | 1 ... <maxnoof Bearers> | | | EACH | ignore |
| >>>E-RAB ID | M | | 9.2.18 | | — | — |
| >>>E-RAB Level QoS Parameters | M | | 9.2.19 | Includes necessary QoS parameters | — | — |
| >>> eNB GTP Tunnel Endpoint | M | | GTP Tunnel Endpoint 9.2.22 | Endpoint of the Xw transport bearer at the eNB | — | — |
| >E-RABs To Be Modified List | | 0 ... 1 | | | — | — |
| >>E-RABs To Be Modified Item | | 1 ... <maxnoof Bearers> | | | EACH | ignore |
| >>>E-RAB ID | M | | 9.2.18 | | — | — |
| >>>E-RAB Level QoS Parameters | O | | 9.2.19 | Includes QoS parameters to be modified | — | — |
| >>> eNB GTP Tunnel Endpoint | O | | GTP Tunnel Endpoint 9.2.22 | Endpoint of the Xw transport bearer at the eNB | — | — |
| >E-RABs To Be Released List | | 0 ... 1 | | | — | — |
| >>E-RABs To Be Released Item | | 1 ... <maxnoof Bearers> | | | EACH | ignore |
| >>>E-RAB ID | M | | 9.2.18 | | — | — |

TABLE 3-continued

| IE/Group Name | Presence | Range | IE type and reference | Semantics description | Criticality | Assigned Criticality |
|---|---|---|---|---|---|---|
| >>>DL Forwarding GTP Tunnel Endpoint | O | | GTP Tunnel Endpoint 9.2.22 | Identifies the Xw transport bearer used for forwarding of DL PDUs | — | — |
| Mobility Set | O | | 9.2.28 | | YES | reject |

Referring to Table 3, the WT Modification Request message includes eNB Xw AP ID ("eNB UE XwAP ID"), WT Xw AP ID ("WT UE XwAP IE"), 2) E-RAB ID, E-RAB QoS and eNB GTP tunnel endpoint for E-RABs to be added/modified (in "E-RABs To Be Added Item", "E-RABs To Be Modified Item"), data forwarding indication for E-RABs to be released (in "E-RABs To Be Release Item"), security key ("WLAN Security Information"), selected WLAN identifier ("Mobility Set") and cause to modify ("Cause").

If the WT accepts the request, it applies the modified WLAN resource configuration, and in step S201, the WT transmits a WT Modification Request Acknowledge message to the eNB. That is, in case resource modification at the WT has been performed successfully, the WT responds with the WT Modification Request Acknowledge message. More specifically, the WT Modification Request Acknowledge message may include at least one of 1) eNB Xw AP ID, WT Xw AP ID to identify the UE, 2) admitted E-RAB IDs for E-RABs to be added/modified/released, 3) WT GTP tunnel endpoint (for DL PDU delivery) for admitted E-RABs, 4) not admitted E-RAB IDs, 5) data forwarding TEIDs, or 6) parameters need to be delivered to UE through eNB (e.g. beacon). For LTE-WLAN integration, all pieces of information described above may be included in the WT Modification Request Acknowledge message. For LTE-WLAN interworking, 1), 2), 4) and 6) among pieces of information described above may be included in the WT Modification Request Acknowledge message.

Table 4 shows an example of the WT Modification Request Acknowledge message. This message is sent by the WT to confirm the eNB about the WT addition preparation.

TABLE 4

| IE/Group Name | Presence | Range | IE type and reference | Semantics description | Criticality | Assigned Criticality |
|---|---|---|---|---|---|---|
| Message Type | M | | 9.2.1 | | YES | reject |
| eNB UE XwAP ID | M | | UE XwAP ID 9.2.24 | Assigned by the eNB | YES | ignore |
| WT UE XwAP ID | M | | UE XwAP ID 9.2.24 | Assigned by the WT | YES | ignore |
| E-RABs Admitted List | | 0 . . . 1 | | | YES | ignore |
| >E-RABs Admitted To Be Added List | | 0 . . . 1 | | | — | — |
| >>E-RABs Admitted To Be Added Item | | 1 . . . <maxnoof Bearers> | | | EACH | ignore |
| >>>E-RAB ID | M | | 9.2.18 | | — | — |
| >>>WT GTP Tunnel Endpoint | M | | GTP Tunnel Endpoint 9.2.22 | Endpoint of the Xw transport bearer at the WT. | — | — |
| >E-RABs Admitted To Be Modified List | | 0 . . . 1 | | | — | — |
| >>E-RABs Admitted To Be Modified Item | | 1 . . . <maxnoof Bearers> | | | EACH | ignore |
| >>>E-RAB ID | M | | 9.2.18 | | — | — |
| >>>WT GTP Tunnel Endpoint | O | | GTP Tunnel Endpoint 9.2.22 | Endpoint of the Xw transport bearer at the WT. | — | — |
| >E-RABs Admitted To Be Released List | | 0 . . . 1 | | | — | — |
| >>E-RABs Admitted To Be Released Item | | 1 . . . <maxnoof Bearers> | | | EACH | ignore |
| >>>E-RAB ID | M | | 9.2.18 | | — | — |
| E-RABs Not Admitted List | O | | E-RAB List 9.2.23 | A value for E-RAB ID shall only be present once in E-RABs Admitted List IE and in E- | YES | ignore |

TABLE 4-continued

| IE/Group Name | Presence | Range | IE type and reference | Semantics description | Criticality | Assigned Criticality |
|---|---|---|---|---|---|---|
| | | | | RABs Not Admitted List IE. | | |
| Criticality Diagnostics | O | | 9.2.5 | | YES | ignore |

Referring to Table 4, the WT Modification Request Acknowledge message includes eNB Xw AP ID ("eNB UE XwAP ID"), WT Xw AP ID ("WT UE XwAP ID"), admitted E-RAB IDs and WT GTP tunnel endpoint for E-RABs to be added/modified/released (in "E-RABs Admitted To Be Added Item"), and not admitted E-RAB IDs ("E-RABs Not Admitted List").

If the modification requires RRC configuration, in step S202, the eNB may transmit the RRCConnectionReconfiguration message to the UE including the new WLAN radio resource configuration. In step S203, the UE may apply the new RRC configuration and may reply with RRCConnectionReconfigurationComplete message to the eNB. The UE starts using the new LWA configuration. In step S204, the eNB may transmit a WLAN Reconfiguration Complete message to the WT to indicate the status to the WT.

Thereafter, the eNB may transmit the SN Status Transfer message to the WT, and data may be forwarded from the S-GW to the WT via the eNB. These steps may be performed for LTE-WLAN integration. Or, the eNB may perform the path update procedure towards the MME by indicating the E-RABs to be offloaded to the WT. The MME may transmit the Path Update Acknowledge message to the eNB. These steps may be performed for LTE-WLAN interworking. It is described above as if procedures for LTE-WLAN aggregation and procedures for LTE-WLAN interworking are separate from each other. However, it does not have to be separate from each other.

Figure 13:
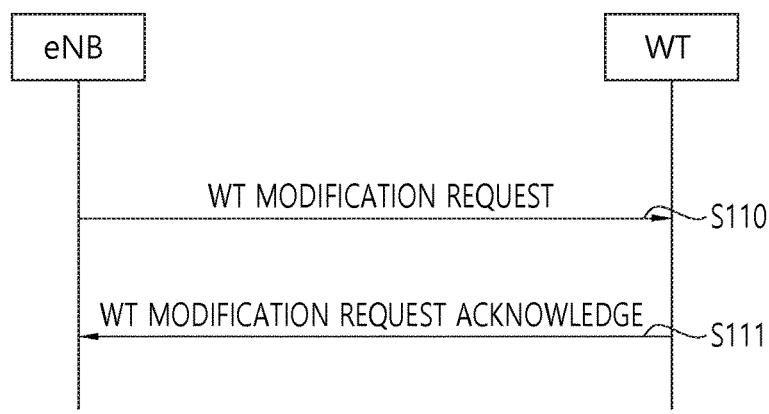
FIG. 13 shows another example of an eNB initiated WT modification procedure according to an embodiment of the present invention.

FIG. 13 shows another example of an eNB initiated WT modification procedure according to an embodiment of the present invention.

In step S210, the eNB transmits the WT Modification Request message to the WT. Step S210 may correspond to step S200 of FIG. 12. The WT Modification Request message may follow Table 3 described above.

In step S211, the WT transmits the WT Modification Request Acknowledge message to the eNB. Step S211 may correspond to step S201 of FIG. 12. The WT Modification Request Acknowledge message may follow Table 4 described above.

(3) WT Initiated WT Modification Procedure

Figure 14:
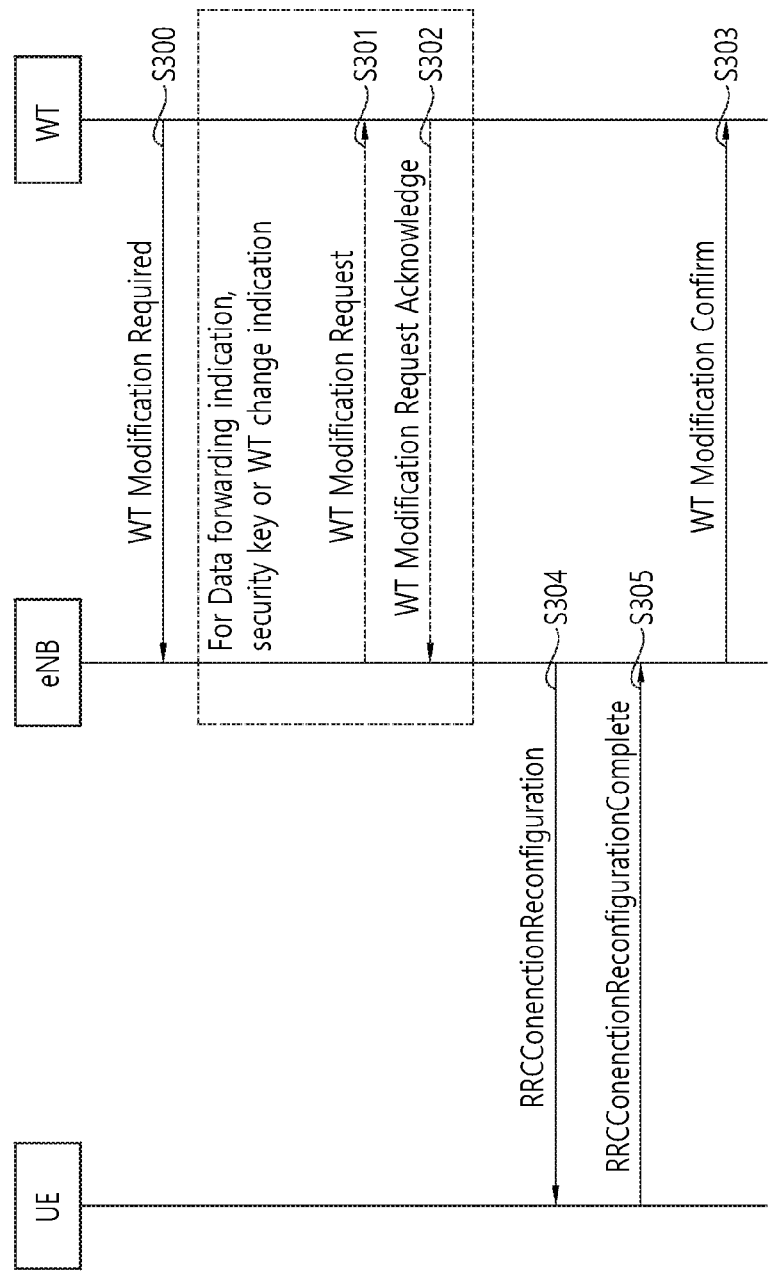
FIG. 14 shows an example of a WT initiated WT modification procedure according to an embodiment of the present invention.

FIG. 14 shows an example of a WT initiated WT modification procedure according to an embodiment of the present invention. The WT initiated WT modification procedure may be used to modify, establish or release bearer contexts or to modify other properties of the UE context within the same WT. That is, the WT initiated WT modification procedure may be used to request the eNB to release LWA bearer(s) for a specific UE. For example, when the load situation of WLAN is not good, the WT may be allowed to trigger the modification for added bearers, i.e. to request to release some of them. In addition, the WT may be allowed to trigger to the parameters change, e.g. mobility set change of SSID serving the UE, etc. or security parameters. The WT modification procedure may not necessarily need to involve signaling towards the UE.

In step S300, the WT transmits a WT Modification Required message to the eNB. By this step, the WT may request the release of the allocated WLAN resources for specific E-RABs. More specifically, the WT Modification Required message may include at least one of 1) eNB Xw AP ID, WT Xw AP ID to identify the UE, 2) E-RAB ID and cause for E-RABs to be released, 3) cause to modify, or 4) WT change indication. The WT change indication may include at least one of security key/parameters change, or mobility set change (WLAN IDs, e.g. SSID/BSSID).

Table 5 shows an example of the WT Modification Required message. This message is sent by the WT to the eNB to request the release or modification of LWA bearers for a specific UE.

TABLE 5

| IE/Group Name | Presence | Range | IE type and reference | Semantics description | Criticality | Assigned Criticality |
|---|---|---|---|---|---|---|
| Message Type | M | | 9.2.1 | | YES | reject |
| eNB UE XwAP ID | M | | UE XwAP ID 9.2.24 | Assigned by the eNB | YES | reject |
| WT UE XwAP ID | M | | UE XwAP ID 9.2.24 | Assigned by the WT | YES | reject |
| Cause | M | | 9.2.4 | | YES | ignore |
| E-RABs To Be Released List | | 0 . . . 1 | | | YES | ignore |
| >E-RABs To Be Released Item | | 1 . . . <maxnoof Bearers> | | | EACH | ignore |
| >>E-RAB ID | M | | 9.2.18 | | — | — |
| >>Cause | M | | 9.2.4 | | — | — |
| E-RABs To Be Modified List | | 0 . . . 1 | | | | |
| >E-RABs To Be Modified Item | | 1 . . . <maxnoof Bearers> | | | EACH | ignore |

TABLE 5-continued

| IE/Group Name | Presence | Range | IE type and reference | Semantics description | Criticality | Assigned Criticality |
|---|---|---|---|---|---|---|
| >>E-RAB ID | M | | 9.2.18 | | — | — |
| >>WT GTP Tunnel Endpoint | O | | GTP Tunnel Endpoint 9.2.22 | Endpoint of the Xw transport bearer at the WT | — | — |

Referring to Table 5, the WT Modification Required message includes eNB Xw AP ID ("eNB UE XwAP ID"), WT Xw AP ID ("WT UE XwAP ID"), E-RAB ID and cause for E-RABs to be released (in "E-RABs To Be Released Item") and cause to modify ("Cause").

Further, for at least one of data forwarding indication, security key or WT change indication, in step S301, the eNB may transmit the WT Modification Request message to the WT, and in step S302, the WT may transmit the WT Modification Request Acknowledge message to the eNB.

If the eNB decides to follow the WT request, in step S303, the eNB transmits a WT Modification Confirm message to the WT. More specifically, the WT Modification Request Acknowledge message may include at least one of 1) eNB Xw AP ID, WT Xw AP ID to identify the UE, or 2) parameters need to be delivered to the WT.

Table 6 shows an example of the WT Modification Confirm message. This message is sent by the eNB to inform the WT that the WT initiated WT modification was successful.

Thereafter, the eNB may transmit the SN Status Transfer message to the WT, and data may be forwarded from the S-GW to the WT via the eNB. These steps may be performed for LTE-WLAN integration. Or, the eNB may perform the path update procedure towards the MME by indicating the E-RABs to be offloaded to the WT. The MME may transmit the Path Update Acknowledge message to the eNB. These steps may be performed for LTE-WLAN interworking. It is described above as if procedures for LTE-WLAN aggregation and procedures for LTE-WLAN interworking are separate from each other. However, it does not have to be separate from each other.

Figure 15:
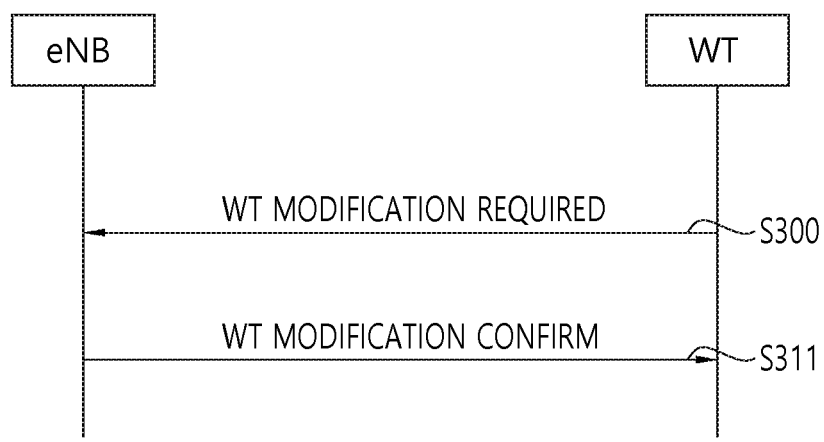
FIG. 15 shows another example of a WT initiated WT modification procedure according to an embodiment of the present invention.

FIG. 15 shows another example of a WT initiated WT modification procedure according to an embodiment of the present invention.

In step S310, the eNB transmits the WT Modification Required message to the WT. Step S310 may correspond to step S300 of FIG. 14. The WT Modification Required message may follow Table 5 described above.

In step S311, the WT transmits the WT Modification Confirm message to the eNB. Step S311 may correspond to

TABLE 6

| IE/Group Name | Presence | Range | IE type and reference | Semantics description | Criticality | Assigned Criticality |
|---|---|---|---|---|---|---|
| Message Type | M | | 9.2.1 | | YES | reject |
| eNB UE XwAP ID | M | | UE XwAP ID 9.2.24 | Assigned by the eNB | YES | ignore |
| WT UE XwAP ID | M | | UE XwAP ID 9.2.24 | Assigned by the WT | YES | ignore |
| E-RABs Confirmed To Be Released List | | 0 . . . 1 | | | — | — |
| >E-RABs Confirmed To Be Released Item | | 1 . . . <maxnoof Bearers> | | | EACH | ignore |
| >>E-RAB ID | M | | 9.2.18 | | — | — |
| >>DL Forwarding GTP Tunnel Endpoint | O | | GTP Tunnel Endpoint 9.2.22 | Identifies the Xw transport bearer used for forwarding of DL PDUs | — | — |
| E-RABs Confirmed To Be Modified List | | 0 . . . 1 | | | — | — |
| >E-RABs Confirmed To Be Modified Item | | 1 . . . <maxnoof Bearers> | | | EACH | ignore |
| >>E-RAB ID | M | | 9.2.18 | | — | — |
| Criticality Diagnostics | O | | 9.2.5 | | YES | ignore |

Referring to Table 5, the WT Modification Confirm message includes eNB Xw AP ID ("eNB UE XwAP ID") and WT Xw AP ID ("WT UE XwAP ID").

If the modification requires RRC configuration, in step S304, the eNB may transmit the RRCConnectionReconfiguration message to the UE including the new WLAN radio resource configuration. In step S305, the UE may apply the new RRC configuration and may reply with RRCConnectionReconfigurationComplete message to the eNB. The UE starts using the new LWA configuration.

step S303 of FIG. 14. The WT Modification Confirm message may follow Table 6 described above.

(4) eNB Initiated WT Release Procedure

Figure 16:
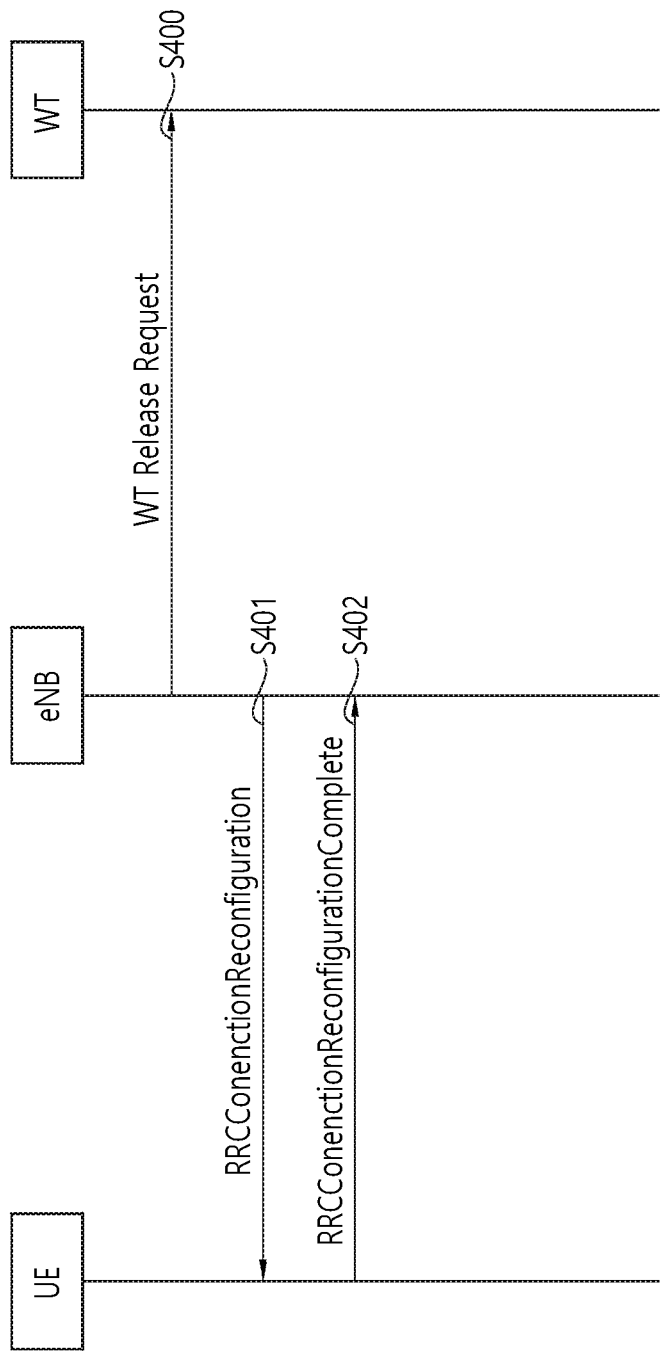
FIG. 16 shows an example of an eNB initiated WT release procedure according to an embodiment of the present invention.

FIG. 16 shows an example of an eNB initiated WT release procedure according to an embodiment of the present invention. The eNB initiated WT release procedure may be used to initiate the release of the UE context at the WT. The recipient node of this request may not reject. The eNB initiated WT release procedure may not necessarily need to involve signaling towards the UE.

In step S400, the eNB transmits a WT Release Request message to the WT. By this step, the eNB may request the WT to release the allocated WLAN resources. More specifically, the WT Release Request message may include at least one of 1) eNB Xw AP ID, WT Xw AP ID to identify the UE, 2) E-RAB ID and DL/UL forwarding GTP tunnel endpoint for E-RABs to be released, or 3) cause to release. The WT initiates release of all allocated WLAN resources.

Table 7 shows an example of the WT Release Request message. This message is sent by the eNB to the WT to request the release of resources.

above as if procedures for LTE-WLAN aggregation and procedures for LTE-WLAN interworking are separate from each other. However, it does not have to be separate from each other.

Figure 17:
FIG. 17 shows another example of an eNB initiated WT release procedure according to an embodiment of the present invention.

FIG. 17 shows another example of an eNB initiated WT release procedure according to an embodiment of the present invention.

In step S410, the eNB transmits the WT Release Request message to the WT. Step S410 may correspond to step S400 of FIG. 16. The WT Release Request message may follow Table 7 described above.

TABLE 7

| IE/Group Name | Presence | Range | IE type and reference | Semantics description | Criticality | Assigned Criticality |
|---|---|---|---|---|---|---|
| Message Type | M | | 9.2.1 | | YES | ignore |
| eNB UE XwAP ID | M | | UE XwAP ID 9.2.24 | Assigned by the eNB | YES | reject |
| WT UE XwAP ID | M | | UE XwAP ID 9.2.24 | Assigned by the WT | YES | reject |
| Cause | O | | 9.2.4 | | YES | ignore |
| E-RABs To Be Released List | | 0 . . . 1 | | | YES | ignore |
| > E-RABs To Be Released Item | | 1 . . . <maxnoof Bearers> | | | EACH | ignore |
| >>E-RAB ID | M | | 9.2.18 | | — | — |
| >>DL Forwarding GTP Tunnel Endpoint | O | | GTP Tunnel Endpoint 9.2.22 | Identifies the Xw transport bearer. used for forwarding of DL PDUs | — | — |

Referring to Table 7, the WT Release Request message includes eNB Xw AP ID ("eNB UE XwAP ID"), WT Xw AP ID ("WT UE XwAP ID"), E-RAB ID and DL/UL forwarding GTP tunnel endpoint for E-RABs to be released (in "E-RABs To Be Release Item"), and cause to release ("Cause").

If required, in step S401, the eNB may transmit the RRCConnectionReconfiguration message to the UE indicating the release of WLAN radio resource configuration. In step S402, the UE may reply with RRCConnectionReconfigurationComplete message to the eNB. The UE may releases the LWA configuration towards the assigned WLAN resources. The eNB transmits the UE Context Release message to the WT.

Figure 18:
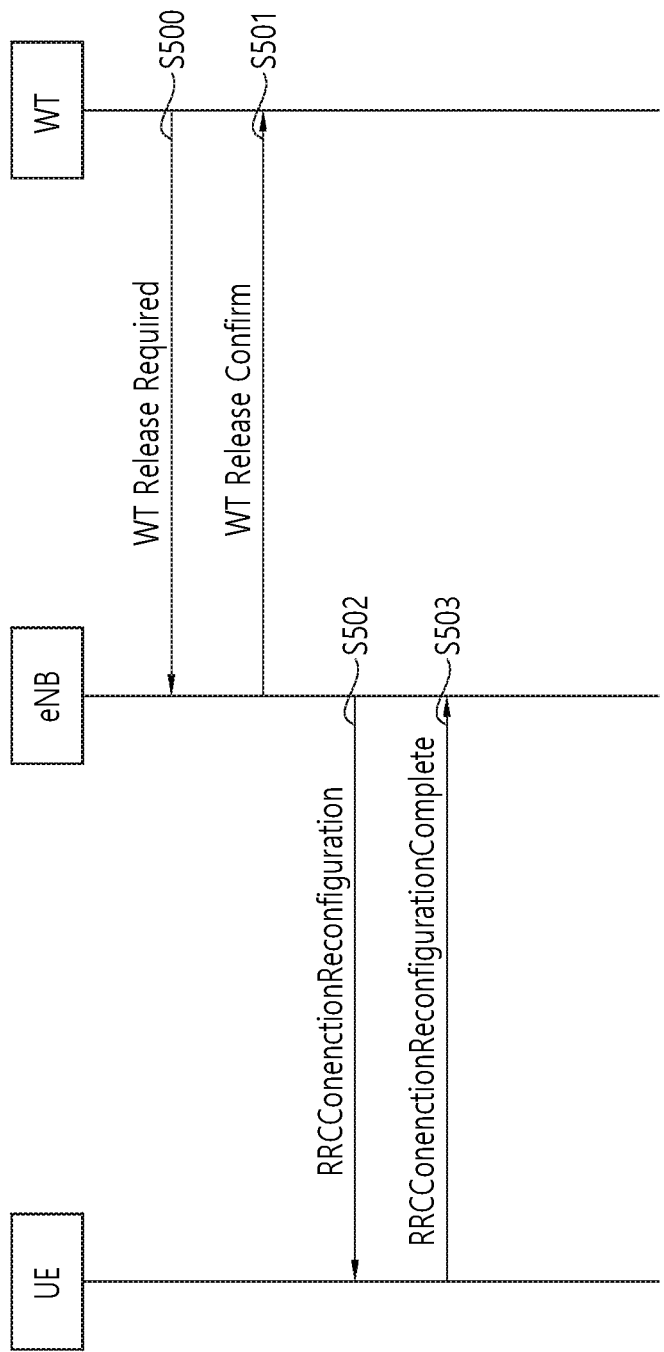
FIG. 18 shows an example of a WT initiated WT release procedure according to an embodiment of the present invention.

Thereafter, the eNB may transmit the SN Status Transfer message to the WT, and data may be forwarded from the WT to the eNB. These steps may be performed for LTE-WLAN integration. Or, the eNB may perform the path update procedure towards the MME by indicating the E-RABs to be offloaded to the WT. The MME may transmit the Path Update Acknowledge message to the eNB. These steps may be performed for LTE-WLAN interworking. It is described (5) WT Initiated WT Release Procedure FIG. 18 shows an example of a WT initiated WT release procedure according to an embodiment of the present invention. The WT initiated WT release procedure may be used to initiate the release of the UE context at the WT. The recipient node of this request may not reject. The eNB initiated WT release procedure may not necessarily need to involve signaling towards the UE.

In step S500, the WT transmits a WT Release Required message to the eNB. By this step, the WT may request the release of the allocated WLAN resources. More specifically, the WT Release Required message may include at least one of 1) eNB Xw AP ID, WT Xw AP ID to identify the UE, or 2) cause to release.

Table 8 shows an example of the WT Release Required message. This message is sent by the WT to request the release of all resources for a specific UE at the WT.

TABLE 8

| IE/Group Name | Presence | Range | IE type and reference | Semantics description | Criticality | Assigned Criticality |
|---|---|---|---|---|---|---|
| Message Type | M | | 9.2.1 | | YES | reject |
| eNB UE XwAP ID | M | | UE XwAP ID 9.2.24 | Assigned by the eNB | YES | reject |
| WT UE XwAP ID | M | | UE XwAP ID 9.2.24 | Assigned by the WT | YES | reject |
| Cause | M | | 9.2.4 | | YES | ignore |

Referring to Table 8, the WT Release Required message includes eNB Xw AP ID ("eNB UE XwAP ID"), WT Xw AP ID ("WT UE XwAP IE") and cause to release ("Cause").

In step S501, the eNB transmits a WT Release Confirm message to the WT. The WT Release Confirm message may include at least one of 1) eNB Xw AP ID, WT Xw AP ID to identify the UE, or 2) E-RAB ID and DL/UL forwarding GTP tunnel endpoint for E-RABs to be released. The WT initiates release of all allocated WLAN resources.

Table 9 shows an example of the WT Release Confirm message. This message is sent by the eNB to confirm the release of all resources for a specific UE at the WT.

TABLE 9

| IE/Group Name | Presence | Range | IE type and reference | Semantics description | Criticality | Assigned Criticality |
|---|---|---|---|---|---|---|
| Message Type | M | | 9.2.1 | | YES | reject |
| eNB UE XwAP ID | M | | UE XwAP ID 9.2.24 | Assigned by the eNB | YES | ignore |
| WT UE XwAP ID | M | | UE XwAP ID 9.2.24 | Assigned by the WT | YES | ignore |
| E-RABs to be Released List | | 0 . . . 1 | | | YES | ignore |
| >E-RABs To Be Released Item | | 1 . . . <maxnoof Bearers> | | | — | — |
| >>E-RAB ID | M | | 9.2.18 | | — | — |
| >>DL Forwarding GTP Tunnel Endpoint | O | | GTP Tunnel Endpoint 9.2.22 | Identifies the Xw transport bearer used for forwarding of DL PDUs | — | — |
| Criticality Diagnostics | O | | 9.2.5 | | YES | ignore |

Referring to Table 9, the WT Release Confirm message includes eNB Xw AP ID ("eNB UE XwAP ID"), WT Xw AP ID ("WT UE XwAP IE") and E-RAB ID and DL/UL forwarding GTP tunnel endpoint for E-RABs to be released (in "E-RABs To Be Release Item").

If required, in step S502, the eNB may transmit the RRCConnectionReconfiguration message to the UE indicating the release of WLAN radio resource configuration. In step S503, the UE may reply with RRCConnectionReconfigurationComplete message to the eNB. The UE may releases the LWA configuration towards the assigned WLAN resources. The eNB transmits the UE Context Release message to the WT.

Thereafter, the WT may transmit the SN Status Transfer message to the eNB. This step may be performed for LTE-WLAN integration. Or, the eNB may perform the path update procedure towards the MME by indicating the E-RABs to be offloaded to the WT. The MME may transmit the Path Update Acknowledge message to the eNB. These steps may be performed for LTE-WLAN interworking. It is described above as if procedures for LTE-WLAN aggregation and procedures for LTE-WLAN interworking are separate from each other. However, it does not have to be separate from each other.

Figure 19:
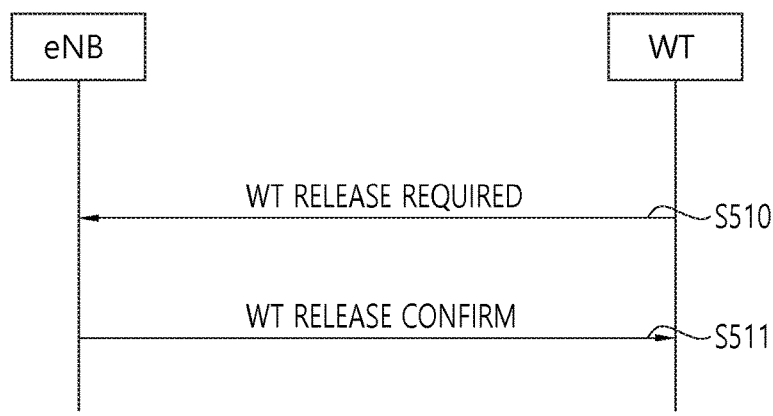
FIG. 19 shows another example of a WT initiated WT release procedure according to an embodiment of the present invention.

FIG. 19 shows another example of a WT initiated WT release procedure according to an embodiment of the present invention.

In step S510, the WT transmits the WT Release Required message to the eNB. Step S510 may correspond to step S500 of FIG. 18. The WT Release Required message may follow Table 8 described above.

In step S511, the eNB transmits the WT Release Confirm message to the WT. Step S511 may correspond to step S501 of FIG. 18. The WT Release Confirm message may follow Table 9 described above.

(6) WT Reconfiguration Notification Procedure

In step S104 of FIG. 10 step S204 of FIG. 12 described above, the eNB may perform the WT reconfiguration complete procedure by transmitting the WT Reconfiguration Complete message to the WT.

When the UE cannot connect to the WT, then WT association failure happens. In order to notify the eNB of WT association failure, a new RRC message may be defined according to an embodiment of the present invention.

Figure 20:
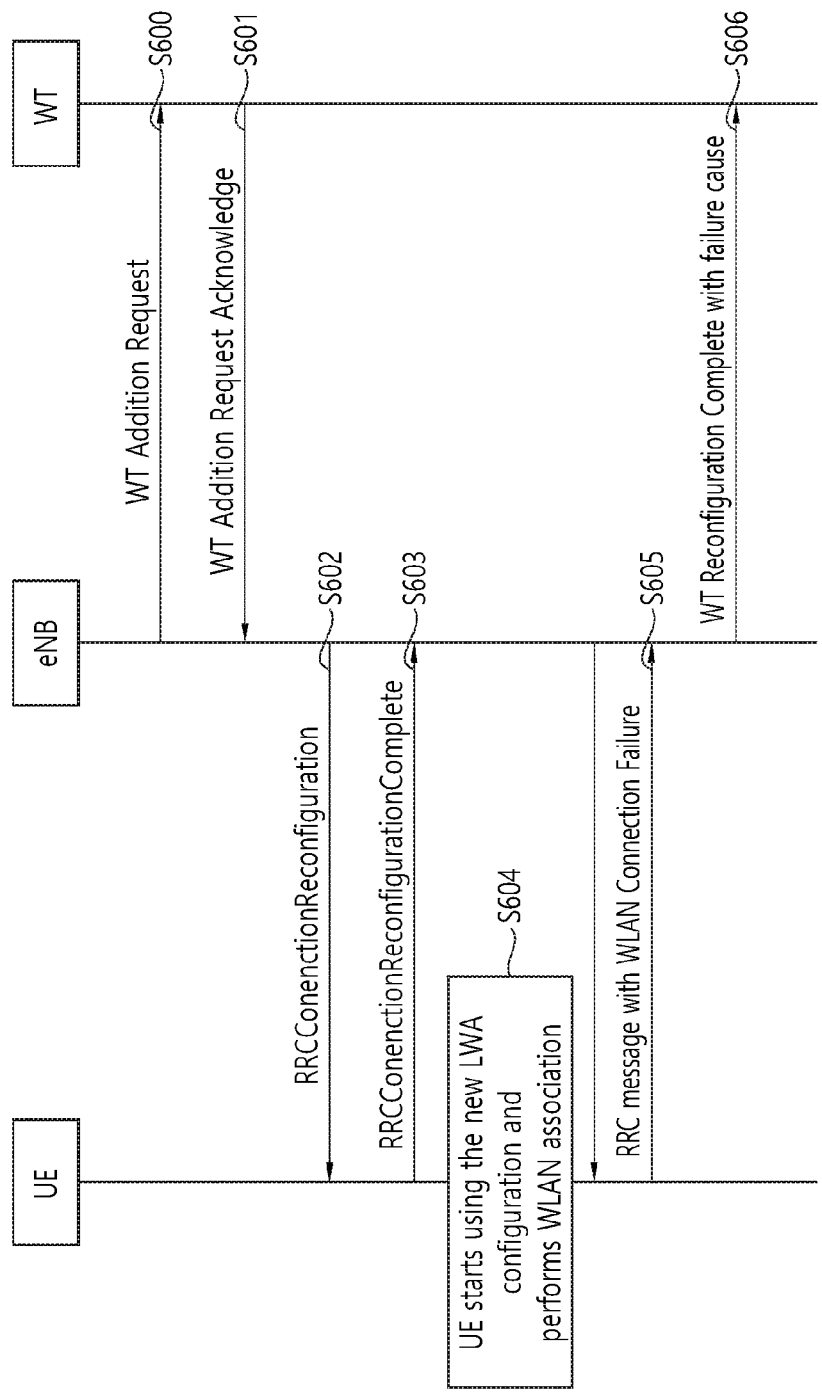
FIG. 20 shows an example of a WT reconfiguration complete procedure according to an embodiment of the present invention.

FIG. 20 shows an example of a WT reconfiguration complete procedure according to an embodiment of the present invention.

In step S600, the eNB transmits the WT Addition Request message to the WT. In step S601, the WT transmits the WT Addition Request Acknowledge message to the eNB. In step S602, the eNB transmits the RRCConnectionReconfiguration message to the UE. In step S603, the eNB transmits the RRCConnectionReconfigurationComplete message to the UE. In step S604, the UE starts using the new LWA configuration and performs WLAN association.

Failure of UE connection to the WLAN may happen. In this case, in step S605, the UE transmits an RRC message with WLAN connection failure. In step S606, the eNB transmits the WT Reconfiguration Complete message with failure cause to the WT. Accordingly, the WT reconfiguration complete procedure may be used both for successful case and failure case. Alternatively, if the eNB judges that something wrong happens with WLAN configuration, the eNB may not trigger the configuration request to the UE (i.e. step S602), and may transmit the WT Reconfiguration Complete message with failure cause to the WT immediately after step S601.

Figure 21:
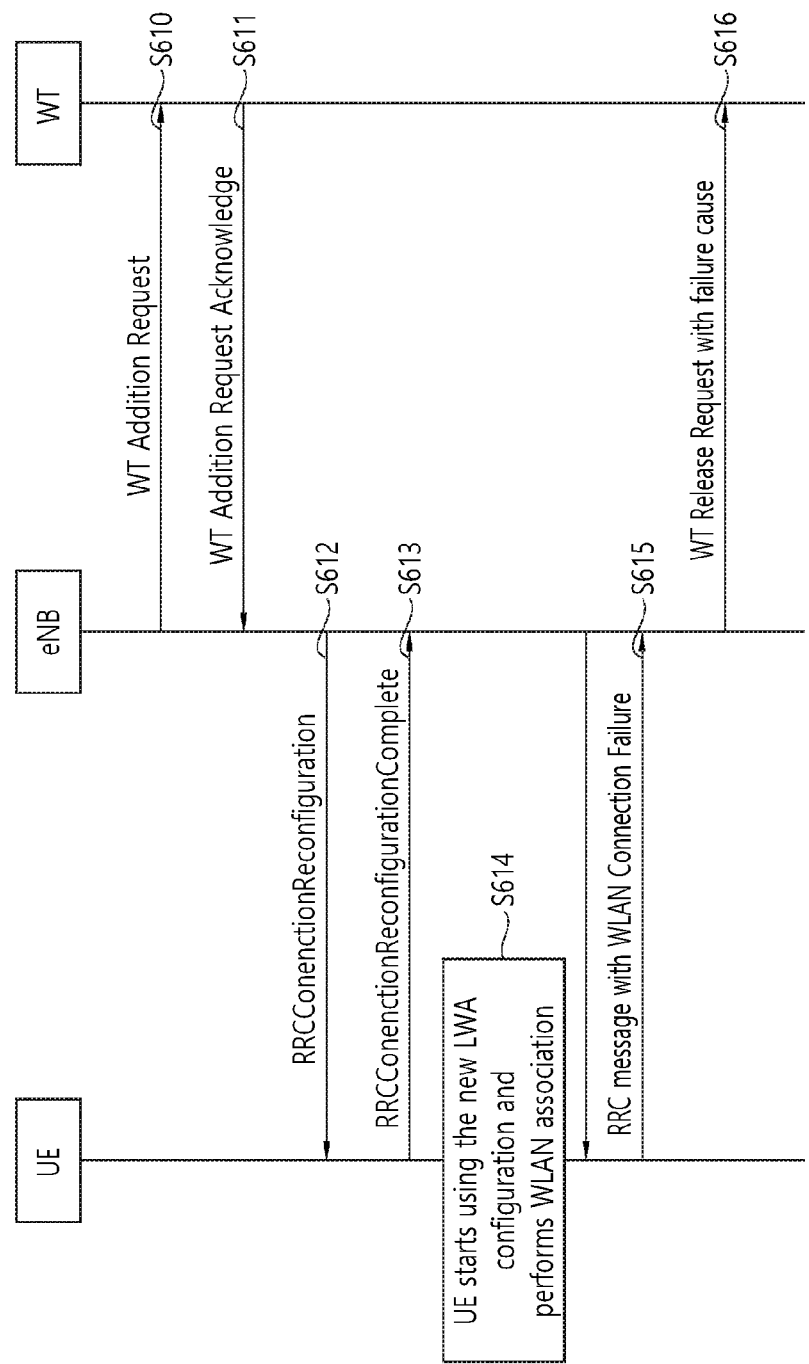
FIG. 21 shows an example of a WT release procedure according to an embodiment of the present invention.

FIG. 21 shows an example of a WT release procedure according to an embodiment of the present invention.

In step S610, the eNB transmits the WT Addition Request message to the WT. In step S611, the WT transmits the WT Addition Request Acknowledge message to the eNB. In step S612, the eNB transmits the RRCConnectionReconfiguration message to the UE. In step S613, the eNB transmits the RRCConnectionReconfigurationComplete message to the UE. In step S614, the UE starts using the new LWA configuration and performs WLAN association.

Failure of UE connection to the WLAN may happen. In this case, in step S615, the UE transmits an RRC message with WLAN connection failure. In step S616, the eNB transmits the WT Release Request message with failure cause to the WT. Alternatively, if the eNB judges that something wrong happens with WLAN configuration, the eNB may not trigger the configuration request to the UE (i.e. step S612), and may transmit the WT Release Request message with failure cause to the WT immediately after step S611.

In the embodiment of FIG. 20 and FIG. 21, the WT addition procedure was used as an example. However, the present invention may also be applied to other procedures such as the WT modification procedure.

Figure 22:
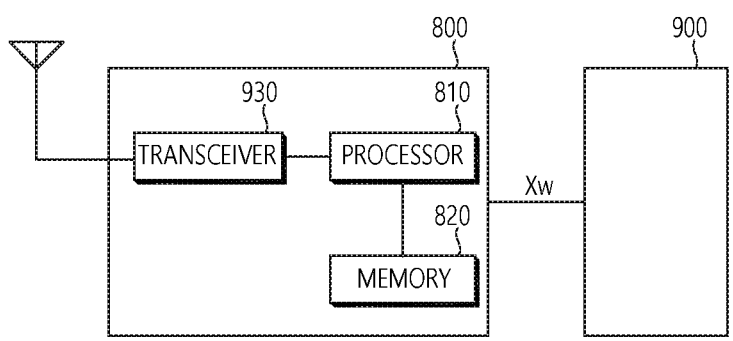
FIG. 22 shows a communication system to implement an embodiment of the present invention.

FIG. 22 shows a communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal. A WT 900 may be connected with the eNB 800 via Xw interface.

The processors 810 may include application-specific integrated circuit (ASIC), other chipset, logic circuit and/or data processing device. The memories 820 may include read-only memory (ROM), random access memory (RAM), flash memory, memory card, storage medium and/or other storage device. The transceivers 830 may include baseband circuitry to process radio frequency signals. When the embodiments are implemented in software, the techniques described herein can be implemented with modules (e.g., procedures, functions, and so on) that perform the functions described herein. The modules can be stored in memories 820 and executed by processors 810. The memories 820 can be implemented within the processors 810 or external to the processors 810 in which case those can be communicatively coupled to the processors 810 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by an eNodeB (eNB) in a wireless communication system, the method comprising:

transmitting, by the eNB, a wireless local area network (WLAN) termination (WT) Addition Request message to a WT via a Xw interface; and receiving, by the eNB, a WT Addition Request Acknowledge message from the WT via the Xw interface, as a response to the WT Addition Request message, wherein the WT is a logical node that terminates the Xw interface, wherein the WT Addition Request message includes an eNB Xw application protocol (AP) identifier (ID) used for the eNB to identify a user equipment (UE), information on an evolved-UMTS terrestrial radio access network (E-UTRAN) radio access bearer (E-RAB) to be added in the WT and a selected WLAN identifier, wherein the information on the E-RAB to be added in the WT includes an E-RAB ID, information on E-RAB quality of service (QoS) and information on an eNB GPRS tunneling protocol (GTP) tunnel endpoint, of the E-RAB to be added in the WT, wherein the WT Addition Request Acknowledge message includes the eNB Xw AP ID, a WLAN Xw AP ID used for the WT to identify the UE, information on an E-RAB admitted by the WT to be added, and wherein the information on the E-RAB admitted by the WT to be added includes an E-RAB ID and information on a WLAN GTP tunnel endpoint, of the E-RAB admitted by the WT to be added.

2. The method of claim 1, wherein the selected WLAN identifier includes at least one of a service set ID (SSID), a basic service set ID (BSSID) or a homogeneous extended service set ID (HESSID)).

3. The method of claim 1, further comprising transmitting a WT Reconfiguration Complete message to the WT.

4. A method performed by an eNodeB (eNB) in a wireless communication system, the method comprising:

transmitting, by the eNB, a wireless local area network (WLAN) termination (WT) Modification Request message to a WT via a Xw interface; and receiving, by the eNB, a WT Modification Request Acknowledge message from the WT via the Xw interface, as a response to the WT Modification Request message, wherein the WT is a logical node that terminates the Xw interface, wherein the WT Modification Request message includes an eNB Xw application protocol (AP) identifier (ID) used for the eNB to identify a user equipment (UE), a WLAN Xw AP ID used for the WT to identify the UE, a cause to modify and information on an evolved-UMTS terrestrial radio access network (E-UTRAN) radio access bearer (E-RAB) to be added or modified or released in the WT, wherein the information on the E-RAB to be added or modified or released in the WT includes an E-RAB ID of the E-RAB to be added or modified or released in the WT, wherein the WT Modification Request Acknowledge message includes the eNB Xw AP ID, the WLAN Xw AP ID, and information on an E-RAB admitted by the WT to be added or modified or released, and wherein the information on the E-RAB admitted by the WT to be added or modified or released includes an E-RAB ID of the E-RAB admitted by the WT to be added or modified or released.

5. The method of claim 4, wherein the selected WLAN identifier includes at least one of a service set ID (SSID), a basic service set ID (BSSID) or a homogeneous extended service set ID (HESSID)).

6. A method performed by an eNodeB (eNB) in a wireless communication system, the method comprising:

receiving, by the eNB, a wireless local area network (WLAN) termination (WT) Modification Required message from a WT via a Xw interface; and transmitting, by the eNB, a WT Modification Confirm message to the WT via the Xw interface, as a response to the WT Modification Required message, wherein the WT is a logical node that terminates the Xw interface, wherein the WT Modification Required message includes an eNB Xw application protocol (AP) identifier (ID) used for the eNB to identify a user equipment (UE), a WLAN Xw AP ID used for the WT to identify the UE, a cause to modify and information on an evolved-UMTS terrestrial radio access network (E-UTRAN) radio access bearer (E-RAB) to be released in the WT, wherein the information on the E-RAB to be released in the WT includes an E-RAB ID of the E-RAB to be released in the WT, and wherein the WT Modification Confirm message includes the eNB AP ID and the WT UE Xw AP ID.

* * * * *